(12) United States Patent
Hiranaka

(10) Patent No.: US 7,307,550 B2
(45) Date of Patent: Dec. 11, 2007

(54) DECODING METHOD, DECODING DEVICE, AND PROGRAM FOR THE SAME

(75) Inventor: Daisuke Hiranaka, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 11/349,968

(22) Filed: Feb. 9, 2006

(65) Prior Publication Data

US 2007/0085712 A1     Apr. 19, 2007

(30) Foreign Application Priority Data

Feb. 9, 2005     (JP)     ............................. 2005-033209

(51) Int. Cl.
*H03M 7/00* (2006.01)
*G06F 1/08* (2006.01)
*H04N 7/50* (2006.01)

(52) U.S. Cl. ................... 341/50; 375/240.26; 713/322; 713/501

(58) Field of Classification Search ................. 341/50, 341/51, 65, 67; 375/240–240.29; 713/300–400, 713/500–600
See application file for complete search history.

(56) References Cited

U.S. PATENT DOCUMENTS

| | | | | |
|---|---|---|---|---|
| 5,880,786 A | * | 3/1999 | Oku et al. | 375/240.15 |
| 6,425,086 B1 | * | 7/2002 | Clark et al. | 713/322 |
| 6,498,812 B1 | * | 12/2002 | Bruls et al. | 375/240 |
| 2003/0133504 A1 | * | 7/2003 | Hanami et al. | 375/240.16 |
| 2004/0073825 A1 | * | 4/2004 | Itoh | 713/323 |
| 2005/0286640 A1 | * | 12/2005 | Gaylord | 375/240.25 |
| 2006/0123262 A1 | * | 6/2006 | Bullman | 713/322 |

* cited by examiner

*Primary Examiner*—Howard L. Williams
(74) *Attorney, Agent, or Firm*—Rader Fishman & Grauer PLLC; Ronald P. Kananen

(57) ABSTRACT

To provide a decoding method and a decoding device capable of reducing a power consumption in a decoding processing and a program for the same. The decoding method to be executed by a decoding device decoding a data to be decoded including a header data and an encoded data, including a steps of: generating a prediction load data indicating a prediction load in a decoding processing for the encoded data, based on an attribute data of the encoded data included in the header data; determining an operating frequency based on the generated prediction load data; and operating at the determined operating frequency to decode the encoded data.

14 Claims, 13 Drawing Sheets

FIG. 6

| FREQUENCY RANGE | VOLTAGE |
|---|---|
| 100~0MHz | 0.9V |
| 200~101MHz | 1.1V |
| 300~201MHz | 1.2V |
| 400~301MHz | 1.3V |
| 500~401MHz | 1.4V |
| 600~501MHz | 1.5V |

BITSTREAM CONFIGURATION IN MACROBLOCK

FIG. 12

| PROCESSING COMPONENTS (SUMMARY OF FUNCTION UNIT MEASUREMENT BY PROFILER IN EACH PROCESSING COMPONENT) | NUMBER OF TOTAL CYCLES | ITEM OF NUMBER OF CYCLES | | RATIO |
|---|---|---|---|---|
| | | PROCESSING | NUMBER OF CYCLES | |
| MOTION COMPENSATION (MC) | 120Mc/sec | FILTERING PROCESSING | 90Mc/s | 40% |
| | | ADDRESS CALCULATION, DATA TRANSFER | 30Mc/s | |
| DEBLOCKING FILTER | 100Mc/sec | FLAG CALCULATION IN EACH MB | 20Mc/s | 33.3% |
| | | FILTERING PROCESSING | 80Mc/s | |
| INVERSE DCT (IDCT) | 30Mc/sec | | | 10% |
| INVERSE QUANTIZATION (IQ) | 20Mc/sec | | | 6.7% |
| VLD | 20Mc/sec | | | 6.7% |
| OTHERS | 10Mc/sec | | | 3.3% |
| TOTAL | 300Mc/sec | | | 100% |

FIG. 13

| PROCESSING COMPONENTS (SUMMARY OF FUNCTION UNIT MEASUREMENT BY PROFILER IN EACH PROCESSING COMPONENT) | NUMBER OF CYCLES | RATIO | PARAMETER CONCERNING NUMBER OF CYCLES | PARAMETER VALUE IN THIS STREAM |
|---|---|---|---|---|
| IMAGE INTERPOLATION PROCESSING FOR MC | 120Mc/sec | 40% | INTERPOLATION PIXEL POSITION RATIO | SAME RATIO OF INTEGER PIXEL POSITION AND 1 to 5 |
| DEBLOCKING FILTER | 100Mc/sec | 33.3% | RATIO OF EDGES filterSamplesFlag BEING TRUE | 30% |
| IDCT | 30Mc/sec | 10% | RATIO OF COEFFICIENT IN ROW OR COLUMN OF DCT BLOCK | 30% |
| IQ | 20Mc/sec | 6.7% | NUMBER OF DCT COEFFICIENTS | 10% |
| VLD | 20Mc/sec | 6.7% | | |
| OTHERS | 10Mc/sec | 3.3% | | |
| TOTAL | 300Mc/sec | 100% | | |

… (1)

DECODING METHOD, DECODING DEVICE, AND PROGRAM FOR THE SAME

CROSS REFERENCES TO RELATED APPLICATIONS

The present invention contains subject matter related to Japanese Patent Application JP 2005-33209 filed in the Japanese Patent Office on Feb. 9, 2005, the entire contents of which being incorporated herein by reference.

BACKGROUND OF THE INVENTION

1. Field of the Invention

The present invention relates to a decoding method and a decoding device for decoding an encoded data, and a program for the same.

2. Description of the Related Art

There is known a decoding device for decoding a data encoded by a moving picture experts group (MPEG) and an advanced video coding (AVC).

The decoding device for example determines a parameter used for a decoding processing based on a header data included in the encoded data and carries out the decoding processing based on the parameter.

In the decoding processing, a decoded image data is generated uninterruptedly by predicting a maximum value of a decoding processing amount, and determining an operating frequency of the decoding device so as to perform decoding in the maximum value at a predetermined rate.

SUMMARY OF THE INVENTION

The above decoding device however suffers from a disadvantage that an uninterrupted power supply corresponding to a maximum load results in a large power consumption.

Particularly, in recent year, a processability of a central processing unit (CPU) has been improved, so the decoding processing by software in the device has been popularized. In this case, the device also suffers from a disadvantage that the power consumption becomes greatly larger than that in an exclusive hardware.

The present invention is to provide a decoding method and a decoding device capable of reducing the power consumption for the decoding processing and a program for the same.

According to an embodiment of the present invention, there is provided a decoding method to be executed by a decoding device decoding a data to be decoded including a header data and an encoded data, the method having: a first step of generating a prediction load data indicating a prediction load in a decoding processing for the encoded data, based on an attribute data of the encoded data included in the header data; a second step of determining an operating frequency based on the prediction load data generated in the first step; and a third step of operating at the operating frequency determined in the second step to decode the encoded data.

According to an embodiment of the present invention, there is provided a decoding device decoding a data to be decoded including a header data and an encoded data, the device having: a load prediction unit of generating a prediction load data indicating a prediction load in a decoding processing for the encoded data, based on an attribute data of the encoded data included in the header data; a determination unit of determining an operating frequency based on the prediction load data generated by the load prediction unit; and a decoding unit of operating at the operating frequency determined by the determination unit to decode the encoded data.

According to an embodiment of the present invention, there is provided a decoding device decoding a data to be decoded including a header data and an encoded data, the device having: a load prediction unit of generating a prediction load data indicating a prediction load in a decoding processing for the encoded data, based on an attribute data of the encoded data included in the header data; a determination unit of determining an operating frequency based on the prediction load data generated by the load prediction unit; a decoding unit of operating based on a clock signal to decode the encoded data; and a clock control unit of outputting to the decoding unit the clock signal at the operating frequency determined by the determination unit.

According to an embodiment of the present invention, there is provided a program to be executed by a decoding device decoding a data to be decoded including a header data and an encoded data, the program having: a first routine of generating a prediction load data indicating a prediction load in a decoding processing for the encoded data, based on an attribute data of the encoded data included in the header data; a second routine of determining an operating frequency based on the generated prediction load data; and a third routine of operating at the determined operating frequency to decode the encoded data.

BRIEF DESCRIPTION OF THE DRAWINGS

These and other features of the present invention will be apparent in more detail with reference to the accompanying drawings, in which:

FIG. 6 is a view for illustrating a control of the frequency of the clock signal and the voltage based on a clock number prediction;

FIG. 12 is a view for illustrating an outline of the number of cycles in the decoding device shown in FIG. 1; and FIG. 13 is a view for illustrating an outline of the number of cycles in the decoding device shown in FIG. 1.

DESCRIPTION OF THE PREFERRED EMBODIMENTS

Preferred embodiments of the present invention will be described with reference to the drawings.

Figure 1:
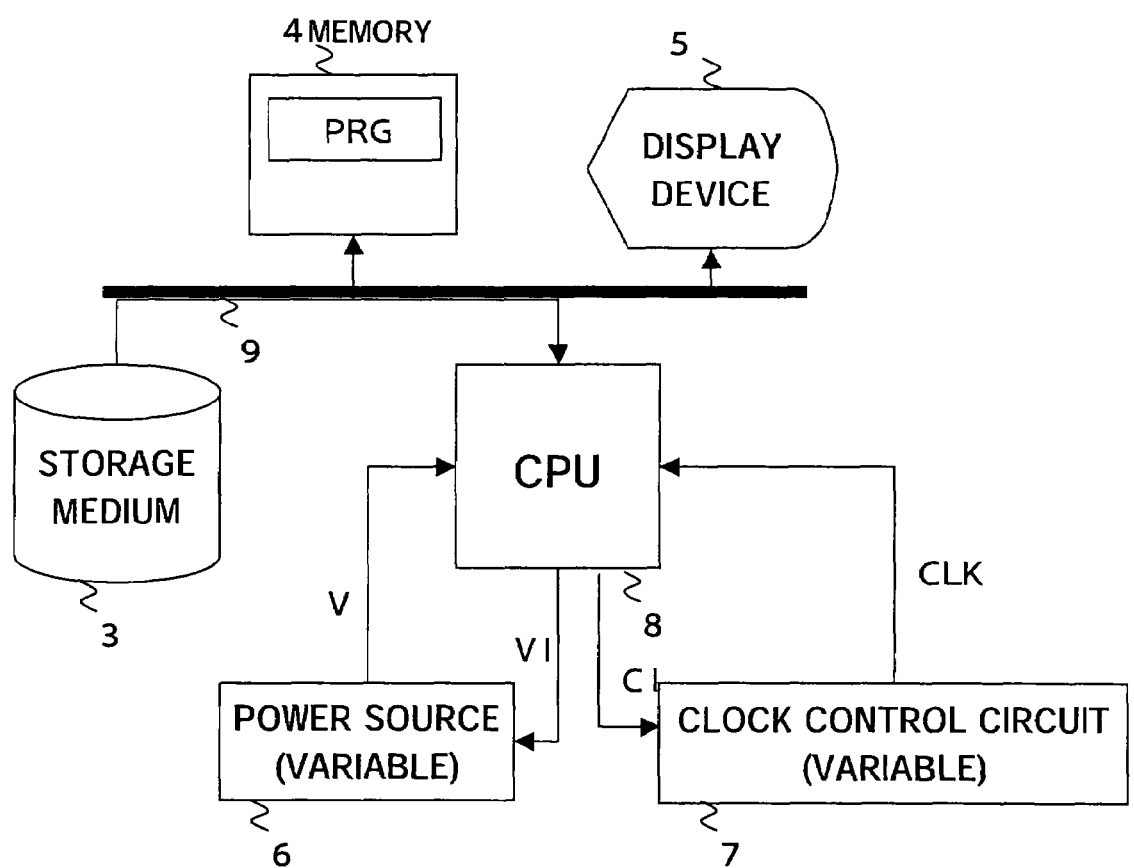
FIG. 1 is a block diagram illustrating a configuration of a decoding device of an embodiment according to the present invention.

FIG. 1 is a block diagram illustrating a hardware configuration of a decoding device 1 of the present embodiment according to the present invention.

The decoding device 1 for example is provided with a storage medium 3, a memory 4, a display device 5, a power source 6, a clock control circuit 7 and a central processing unit (CPU) 8 as shown in FIG. 1.

The storage medium 3 stores a bitstream ED to be decoded.

The memory 4 stores a program PRG executed by the CPU 8 and a data used to a processing performed by the CPU 8.

The display device 5 displays an image corresponding to a decoded image data decoded by the CPU 8.

The power source 6 supplies CPU 8 with a voltage corresponding to a voltage designation signal VI output from the CPU 8.

The clock control circuit 7 outputs to the CPU 8 a clock signal CLK indicating a frequency given from a clock designation signal CI output from the CPU 8.

The CPU 8 decodes the bitstream ED read from the recoding medium 3.

The CPU 8 predicts the number of clocks demanded for the decoding processing prior to executing the decoding of the bitstream ED as description later and generates the clock designation signal CI and the voltage designation signal VI based on the predicted result.

Namely, the CPU 8 predicts the number of clocks demanded for the decoding processing prior to executing the decoding processing, determines for example a frequency of the clock signal CLK demanded for accomplishing (not ruining) the decoding processing (for example, keeping a desired reproduction speed), and operates at the frequency.

Therefore, the CPU 8 can be avoided from operating at a frequency higher than necessary, so a power-saving is achieved.

Figure 2:
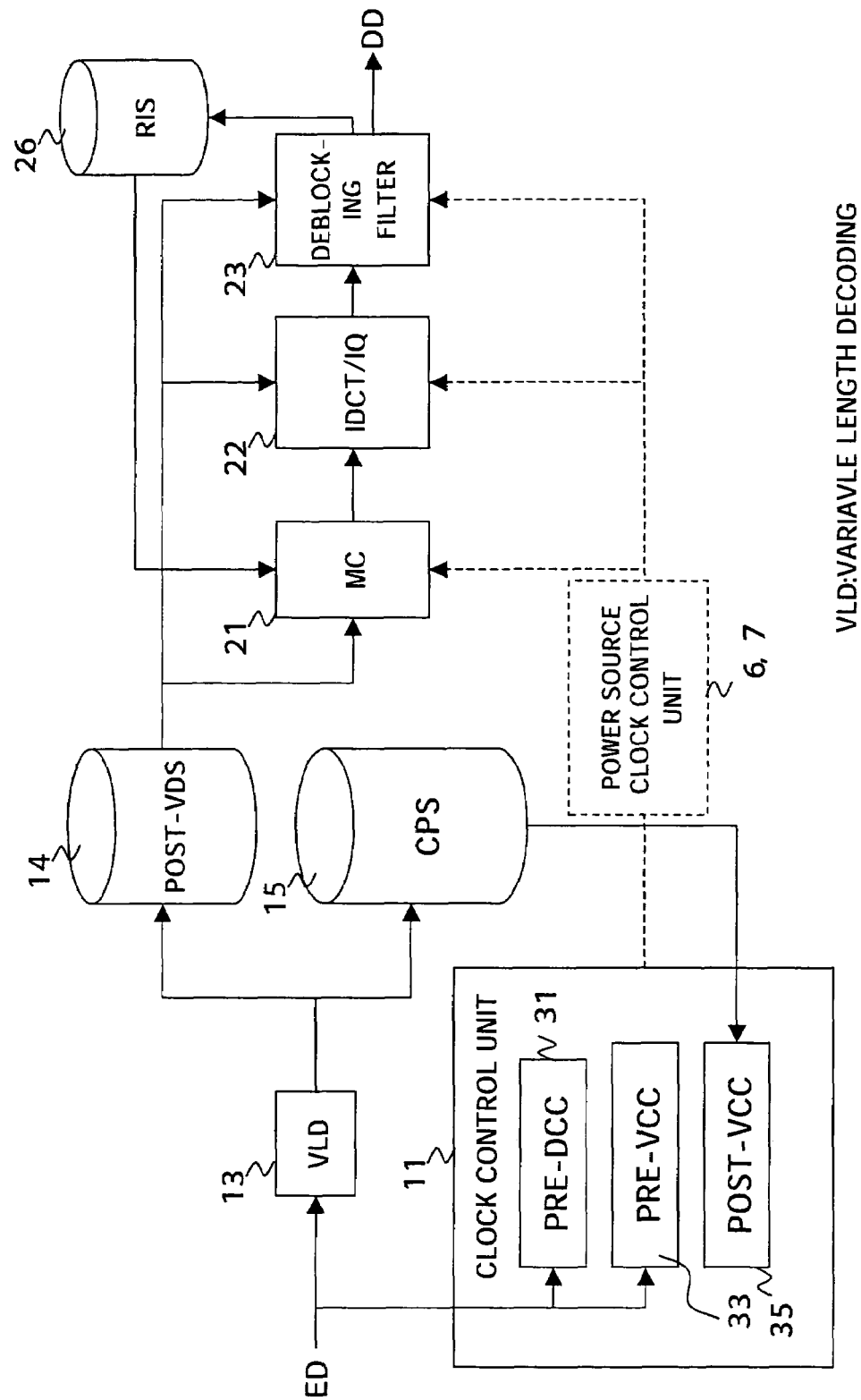
FIG. 2 is a functional block diagram of a CPU shown in FIG. 1.

FIG. 2 is a block diagram illustrating a function for executing and realizing the program PRG by the CPU 8 shown in FIG. 1.

The CPU 8 executes the program PRG to thereby realize a clock control unit 11, a variable length decoding (VLD) unit 13, a post-VLD data storage (POST-VDS) unit 14, a number cycles presumption parameter storage (CPS) unit 15, a motion prediction compensation (MC) unit 21, an inverse discrete cosine transformation and inverse quantization (IDCT-IQ) unit 22, a deblocking filter 23, and a reference image storage (RIS) unit 26 as shown in FIG. 2.

The clock control unit 11 for example is provided with a pre-decoding clock control (PRE-DCC) unit 31, a pre-VLD clock control (PRE-VCC) unit 33, and a post-VLD clock control (POST-VCC) unit 35 as shown in FIG. 2.

Note that, the entire components or a part thereof shown in FIG. 2 may be realized not by the execution of the program PRG by the CPU 8 but by an application of electric circuits.

Figure 3:
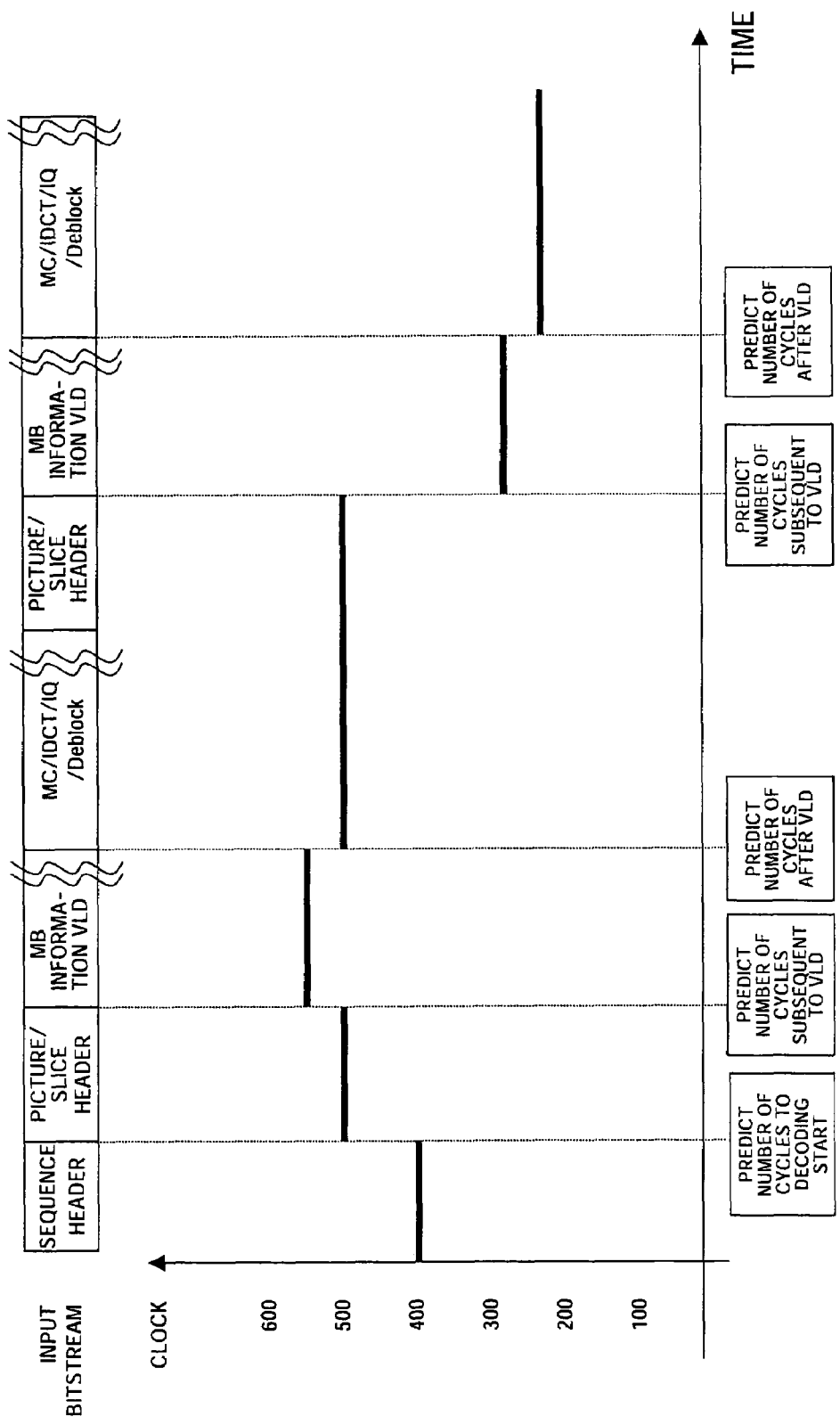
FIG. 3 is a view for illustrating a control of a frequency of a clock signal and a voltage of a power source in a clock control unit shown in FIG. 2.
Figure 4:
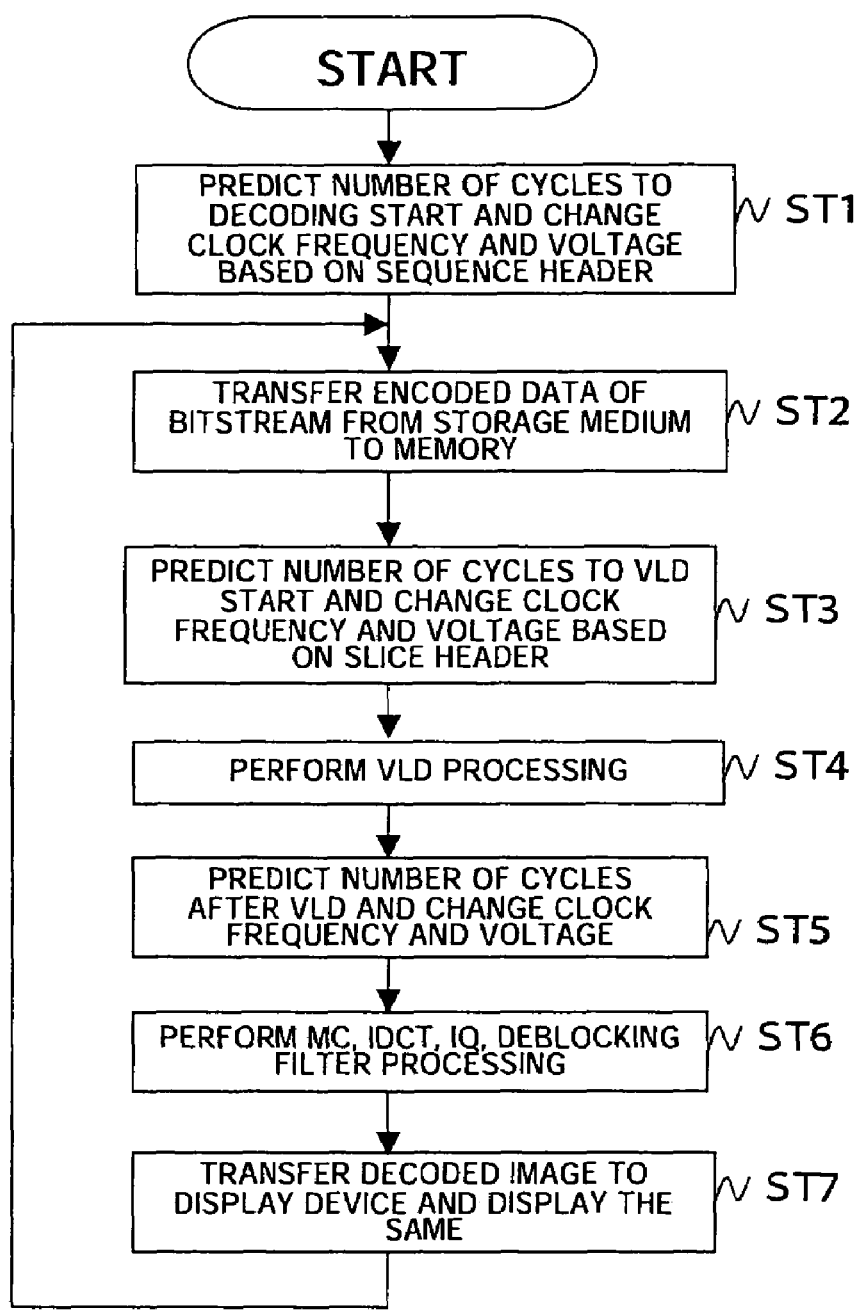
FIG. 4 is a flow chart for illustrating the entire operation of the decoding device shown in FIG. 1 and FIG. 2.

FIG. 3 is a view illustrating a sequence of the decoding processing of CPU 8. FIG. 4 is a flow chart corresponding to the sequence.

Step ST1:

The pre-decoding clock control unit 31 shown in FIG. 2 reads out a sequence header of the bitstream ED from the storage medium 3, analyzes the same, and predicts the number of clock cycles to a decoding start.

The pre-decoding clock control unit 31 determines an applied voltage and the frequency of the clock signal CLK each for the motion prediction Compensation unit 21, the IDC-TIQ unit 22 and the deblocking filter 23 based on the predicted result.

In the above case, the pre-decoding clock control unit 31 for example predicts the number of the clock cycles to the decoding start, based on an information such as a bit rate and a image size of the encoded data and an entropy encoding method stored in the sequence header.

Step ST2:

The CPU 8 reads out the encoded data of the bitstream EB stored in the storage medium 3 and writes the same in the memory 4.

Step ST3:

The pre-VLD clock control unit 33 reads out a slice header of the bitstream ED from the storage medium 3 and predicts the number of clock cycles to a VLD start in the VLD unit 13.

The pre-VLD clock control unit 33 determines the applied voltage and the frequency of the clock signal CLK each for the motion prediction compensation unit 21, the IDC-TIQ unit 22 and the deblocking filter 23 based on the predicted result.

The pre-VLD clock control unit 33 for example predicts a clock frequency to the VLD start, based on information such as a type of the slice data (I, P, B) and the bit number of the slice data stored in the slice head data.

Step ST4:

The encoded data of the bitstream ED read from the memory 4 is subjected to the VLD processing by the VLD unit 13 to thereby obtain a motion vector MV, a quantization scale, and DCT coefficient in the macroblock (MB) header, which are stored in the post-VLD data storage unit 14.

Various parameters for presuming the number of cycles for each decoding (the cycle presumption parameters) are stored in the number cycles presumption parameter storage unit 15 whenever single picture or single slice data is decoded by the VLD unit 13.

Step ST5:

The post-VLD clock control unit 35 predicts the number of clock cycles subsequent to VLD (the number of clock cycles demanded for the motion prediction compensation unit 21, the IDC-TIQ unit 22 and the deblocking filter 23) by applying the cycle presumption parameters stored in the number cycles presumption parameter storage unit 15 at finishing the VLD processing of single picture or single slice data in the VLD unit 13.

The post-VLD clock control unit 35 determines the applied voltage and the frequency of the clock signal CLK each for the motion prediction compensation unit 21, the IDC-TIQ unit 22 and the deblocking filter 23 based on the predicted result.

In the present embodiment, the number cycles presumption parameter storage unit 15 stores an information relating to a transformation coefficient (a fraction in DTC), an interpolation pixel position indicated by the motion vector MV, and an edge to be subjected to the deblocking filter processing, which are applied by the post-VLD clock control unit 35.

Step ST6:

Each of the motion prediction compensation unit 21, the IDC-TIQ unit 22, and the deblocking filter 23 operates in response to the clock signal CLK and the applied voltage determined at step ST5. The decoded image data DD is output from the deblocking filter 23 to the display device 5.

Step ST7:

The display device 5 displays an image corresponding to the decoded image data DD input at step ST6.

It may sometimes take time for changing each voltage and the frequency of the clock signal CLK applied to the power source 6 and the clock control circuit 7.

The decoding device 1 determines and controls a changing timing of the voltage and the clock signal CLK at each different step in the decoding processing in the pre-decoding clock control unit 31, the pre-VLD clock control unit 33, and the post VLD clock control unit 35. Consequently, as the decoding processing proceeds, the device 1 can predict the number of clock cycles demanded for the following decoding processing at a timing as fast as possible, based on an appropriate information. As a result, a power consumption can efficiently be reduced.

In the present embodiment, although the pre-decoding clock control unit 31, the pre-VLD clock control unit 33, and the post-VLD clock control unit 35 control the power source and the clock frequency, one of them may control the same.

For example, only the pre-decoding clock control unit 31 may be used when a change of the applied voltage and the clock frequency are difficult in the decoding processing.

Only the pre-VLD clock control unit 33 may be used or the pre-decoding clock control unit 31 and the post-VLD clock control unit 33 may be used when the change of the applied voltage and the clock frequency are possible before the processing finishes in the VLD unit 13.

(Pre-decoding Clock Control Unit 31)

The pre-decoding clock control unit 31 shown in FIG. 2 will be described.

Figure 5:
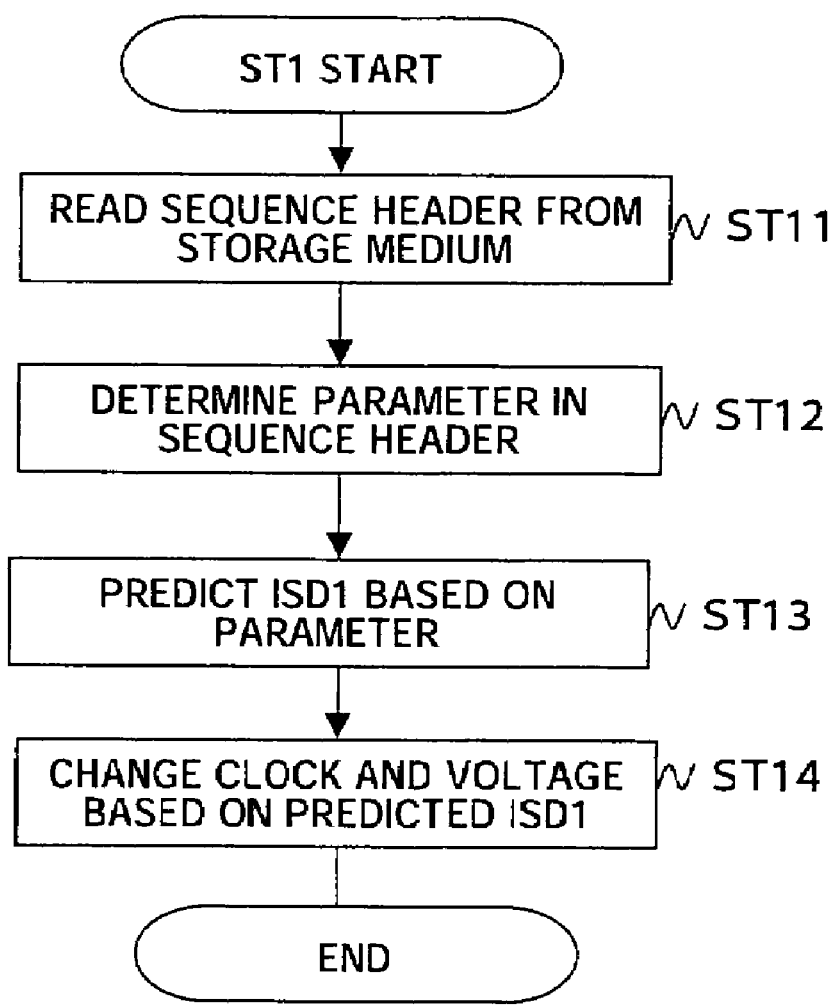
FIG. 5 is a flow chart for illustrating step ST1 (a processing in a pre-decoding clock control unit) shown in FIG. 4.

FIG. 5 is a flow chart illustrating a processing in the pre-decoding clock control unit 31 shown in FIG. 2.

Step ST11:

The pre-decoding clock control unit 31 reads out a sequence header data of the bitstream ED from the recoding medium 3.

Step ST12:

The pre-decoding clock control unit 31 extracts a parameter used for predicting the number of clock cycles to the decoding start, from the sequence header data read at step ST11.

The parameter for example is a macroblock rate (MBrate) of the bitstream ED, a bit rate (bitrate), and a data indicating an existence of an application of a context-adaptive binary arithmetic coding (CABAC) as an encoding method.

Step ST13:

The pre-decoding clock control unit 31 generates a data indicating the prediction number of cycles to the decoding start (pre-decoding prediction cycle data) ISD1 by applying the following formula (1) based on the parameter extracted at step ST12.

(Formula 1)

$$ISD1 = iVLDc + IDCTc + iIQc + iDEBc + iMCc + OTHERc \qquad (1)$$

Where, "iDEBc" indicates the number of clocks demanded for the decoding processing concerning a deblocking filter processing and is calculated by the following formula (2) in the pre-decoding clock control unit 31.

(Formula 2)

$$iDEBc = 100Mc \times MBrate/(396 \times 30) \qquad (2)$$

Where, "Mc" indicates a megacycle in the present embodiment.

"iMCc" indicates the number of clocks demanded for the decoding processing concerning a motion prediction compensation processing and is calculated by the following formula (3) in the pre-decoding clock control unit 31.

(Formula 3)

$$iMCc = 120Mc \times MBrate/(396 \times 30) \qquad (3)$$

"iIDCTc" indicates the number of clocks demanded for the decoding processing concerning an inverse orthogonal transformation processing and is calculated by the following formula (4) in the pre-decoding clock control unit 31.

(Formula 4)

$$iIDTc = 30Mc \times bitrate/384\ kbps \qquad (4)$$

"iIQc" indicates the number of clocks demanded for the decoding processing concerning an inverse quantization processing and is calculated by the following formula (5) in the pre-decoding clock control unit 31.

(Formula 5)

$$iIQc = 20Mc \times bitrate/384\ kbps \qquad (5)$$

"iVLDc" indicates the number of clocks demanded for the decoding processing concerning a variable length decoding processing and is calculated by the following formula (6) in the pre-decoding clock control unit 31.

(Formula 6)

$$iVLDc = 20Mc \times bitrate/384\ kbps \qquad (6)$$

The pre-decoding clock control unit 31 applies to the formula (1) three times of iVLDc obtained by the above formula (6) when CABAC is adopted as the encoding method.

Step ST14:

The pre-decoding clock control unit 31 determines the applied voltages and the frequency of the clock signal CLK with which each of the power source 6 and the CPU 8 supplies the motion prediction compensation unit 21, the IDCT•IQ unit 22, and the deblocking filter 23, based on the pre-decoding prediction cycle data ISD1 calculated at step ST13.

Specifically, the pre-decoding clock control unit 31 generates the clock designation signal CI controlling the clock signal CLK so as to lower the frequency thereof with a decrease of the number of cycles indicated by the data ISD1.

The pre-decoding clock control unit 31 generates the voltage control signal VI controlling the power source 6 so as to decrease the voltage with which the power source 6 applies to the CPU 8 as the frequency of the clock signal CLK is lowered.

Note that, the applied voltages corresponding to each range of the frequency of the clock signal CLK are defined in the power source 6 as shown in FIG. 6, for example.

A power consumption P in the CPU 8 shown in FIG. 1 is indicated as "$C \times F \times V^2$".

Where, $\underline{C}$ indicates a capacity of the CPU 8, $\underline{F}$ indicates the frequency of the clock signal CLK, and $\underline{V}$ indicates a power voltage with which the power source 6 supplies the memory 4.

Namely, $\underline{F}$ and $\underline{V}$ are lowered to reduce the power consumption P of the CPU 8.

On the other hand, the operation of the CPU 8 at the frequency $\underline{F}$ is demanded to apply the power voltage $\underline{V}$ equal to or greater than a predetermined value. The applied voltages shown in FIG. 6 are defined under consideration of the above.

Note that, the pre-decoding clock control unit 31 may predict the number of clocks to a VLD processing start.

(Pre-VLD Clock Control Unit 33)

The pre-VLD clock control unit 33 shown in FIG. 2 will be described.

Figure 7:
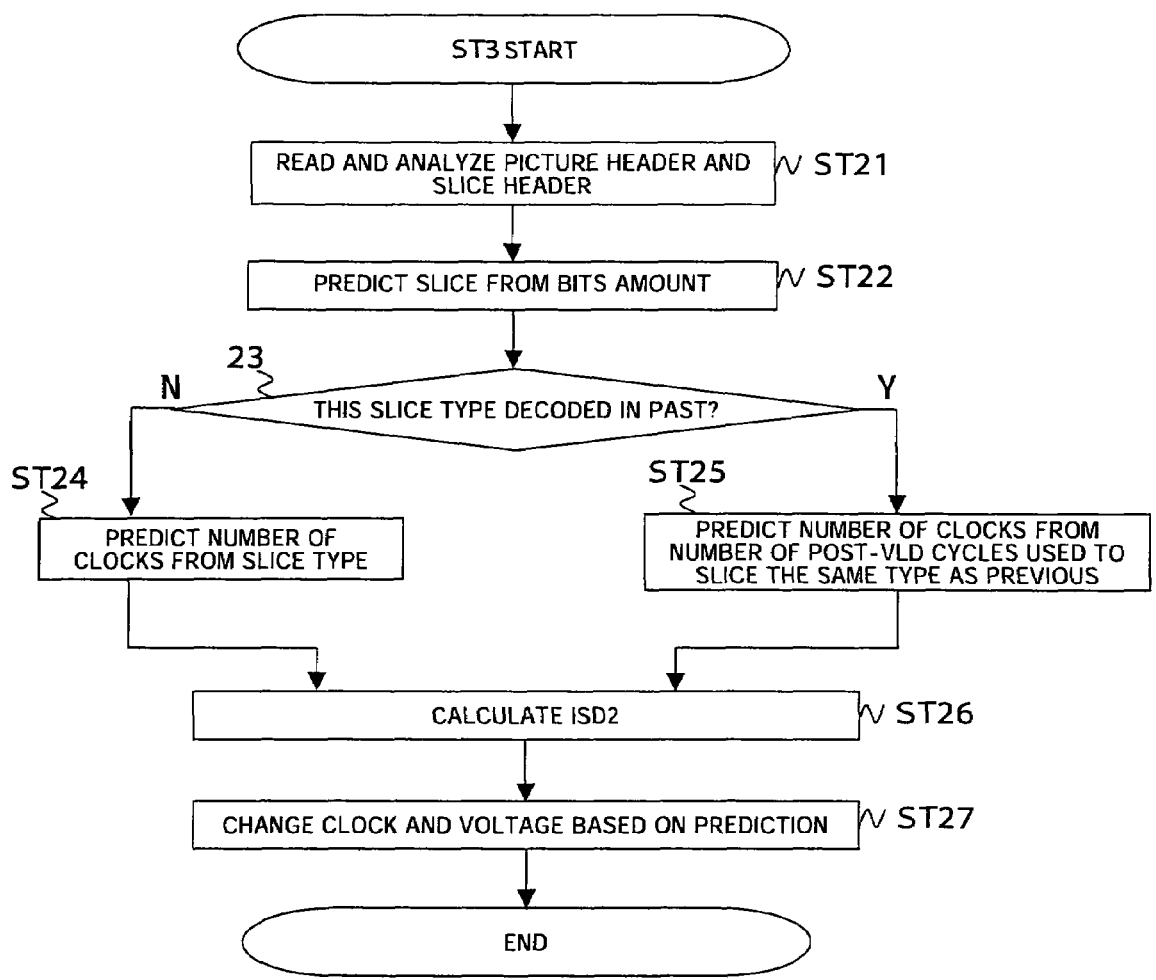
FIG. 7 is a flow chart for illustrating step ST3 (a processing in a pre-VLD clock control unit) shown in FIG. 4.

FIG. 7 is a flow chart for illustrating an example of an operation of the pre-VLD clock control unit 33.

Step ST21:

The pre-VLD clock control unit 33, as shown in FIG. 3, reads a picture header data and a slice header data of the bitstream ED from the storage medium 3 and extracts therefrom a parameter used for predicting the number of clocks to the VLD processing start.

As the parameter, types of the slice data and the amount of bits in the slice data "sliceBitNum" are mentioned.

Step ST22:

The pre-VLD clock control unit 33 calculates "bIDCTc", "bIQc", and "bVLDc" by the following formulas (7), (8), and (9) based on the amount of bits in the slice data indicated by the parameter extracted at step ST21.

(Formula 7)

$$bIDCTc = iIDCTc \times sliceBitNum/(384\ kbps/30\ fps) \quad (7)$$

(Formula 8)

$$bIQc = iIQc \times sliceBitNum/(384\ kbps/30\ fps) \quad (8)$$

(Formula 9)

$$bVLDc = iVLBc \times sliceBitNum/(384\ kbps/30\ fps) \quad (9)$$

Where, "bIDCTc" indicates the number of clocks demanded for the inverse orthogonal transformation processing, "bIQc" indicates the number of clocks demanded for the inverse quantization processing, and "bVLDc" indicates the number of clocks demanded for the variable length decoding processing.

Step ST23:

The pre-VLD clock control unit 33 decides whether or not a data indicating the prediction number of cycles to the VLD processing (pre-VLD prediction cycle data) ISD2 is generated in a slice data the same type as the slice data to be processed, it proceeds to step ST24 when deciding it is not, while proceeds to step ST25 when deciding it is generated.

Step ST24:

The pre-VLD clock control unit 33 calculates "bMCc" and "bDEBc" by the following formulas (10), (11), and (12) depending on each of types I, P, and B of the slice data to be processed.

(Formula 10)

$$I\ slice:\ bMCc = iMCc \times 0.5$$

$$bDEBc = iDEBc \times 2 \quad (10)$$

(Formula 11)

$$P\ slice:\ bMCc = iMCc$$

$$bDEBc = iDEBc \quad (11)$$

(Formula 12)

$$B\ slice:\ bMCc = iMCc \times 2$$

$$bDEBc = iDEBc \times 1.5 \quad (12)$$

Where, "bMCc" indicates the number of clocks demanded for the motion prediction compensation processing, and "bDEBc" indicates the number of clocks demanded for the deblocking filter processing.

"iMCc" applies a value calculated in the pre-decoding clock control unit 31 to the above formula (3), and "iDEBc" applies a value calculated in the pre-decoding clock control unit 31 to the above formula (2).

Step ST25:

The pre-VLD clock control unit 33 calculates "bIDTc", "bIQc", "bVLDc", "bMCc" and "bDEBc" expressed by the following formulas (13), (14), (15), (16) and (17) by applying "PvIDCTc", "PvIQc", "PvVLDc", "PvMCc" and "PvDEBc" corresponding to "bIDTc", "bIQc", "bVLDc", "bMCc" and "bDEBc" used to the same type slice data as the previous.

(Formula 13)

$$bIDCTc = PvIDCTc \times sliceBitNum/PsliceBitNum \quad (13)$$

(Formula 14)

$$bIQc = PvIQc \times sliceBitNum/PsliceBitNum \quad (14)$$

(Formula 15)

$$bVLDc = PvVLDc \times sliceBitNum/PsliceBitNum \quad (15)$$

(Formula 16)

$$bMCc = PvMCc \quad (16)$$

(Formula 17)

$$bDEBc = PvDEBc \quad (17)$$

Step ST26:

The pre-VLD clock control unit 33 calculates the pre-VLD prediction cycle data ISD2 by the following formula (18).

(Formula 18)

$$ISD2 = bIDCTc + bIQc + bDEBc + bMCc + OTHERc \quad (18)$$

Step ST27:

The pre-VLD clock control unit 33 determines the applied voltage and the frequency of the clock signal CLK with which each of the power source 6 and the CPU 8 applies to the motion prediction compensation unit 21, the IDCT•IQ unit 22, and the deblocking filter 23, based on the data ISD2 calculated at step ST26.

Specifically, the pre-VLD clock control unit 33 generates the clock designation signal CI controlling the clock signal CLK so as to lower the frequency thereof as the number of cycles indicated by the data ISD2 is decreased.

The pre-VLD clock control unit 33 generates the voltage control signal VI controlling the power source 6 so as to decrease the voltage with which the power source 6 applies to the CPU 8 as the frequency of the clock signal CLK is lowered.

Note that, the applied voltages corresponding to each range of the frequency of the clock signal CLK are defined in the power source 6 as shown in FIG. 6, for example.

(Variable length decoding unit 13 and post-VLD clock control unit 35)

Figure 8:
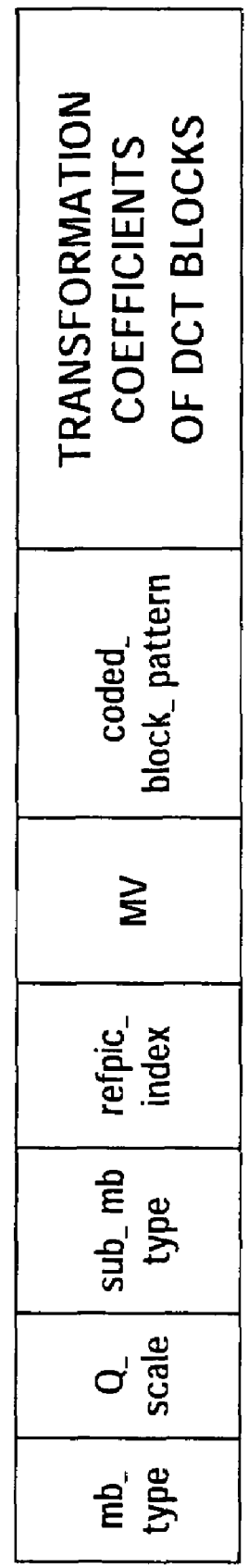
FIG. 8 is a view for illustrating an information decoded by a variable length decoding unit shown in FIG. 2.

The encoded data of the bitstream ED includes in each macroblock an information illustrated in FIG. 8, which is decoded by the VLD unit 13 and stored in the post-VLD data storage unit 14 and the cycle number presumption parameter storage unit 15.

As shown in FIG. 8, a macroblock includes data of a macroblock type "mb_type", a quantization scale "Q_scale", a sub-macroblock type "sub_mb_type", a reference picture index "refpic_index", a motion vector MV, a encoded block pattern "coded_block_pattern", and a transformation coefficient of DCT block.

Figure 9:
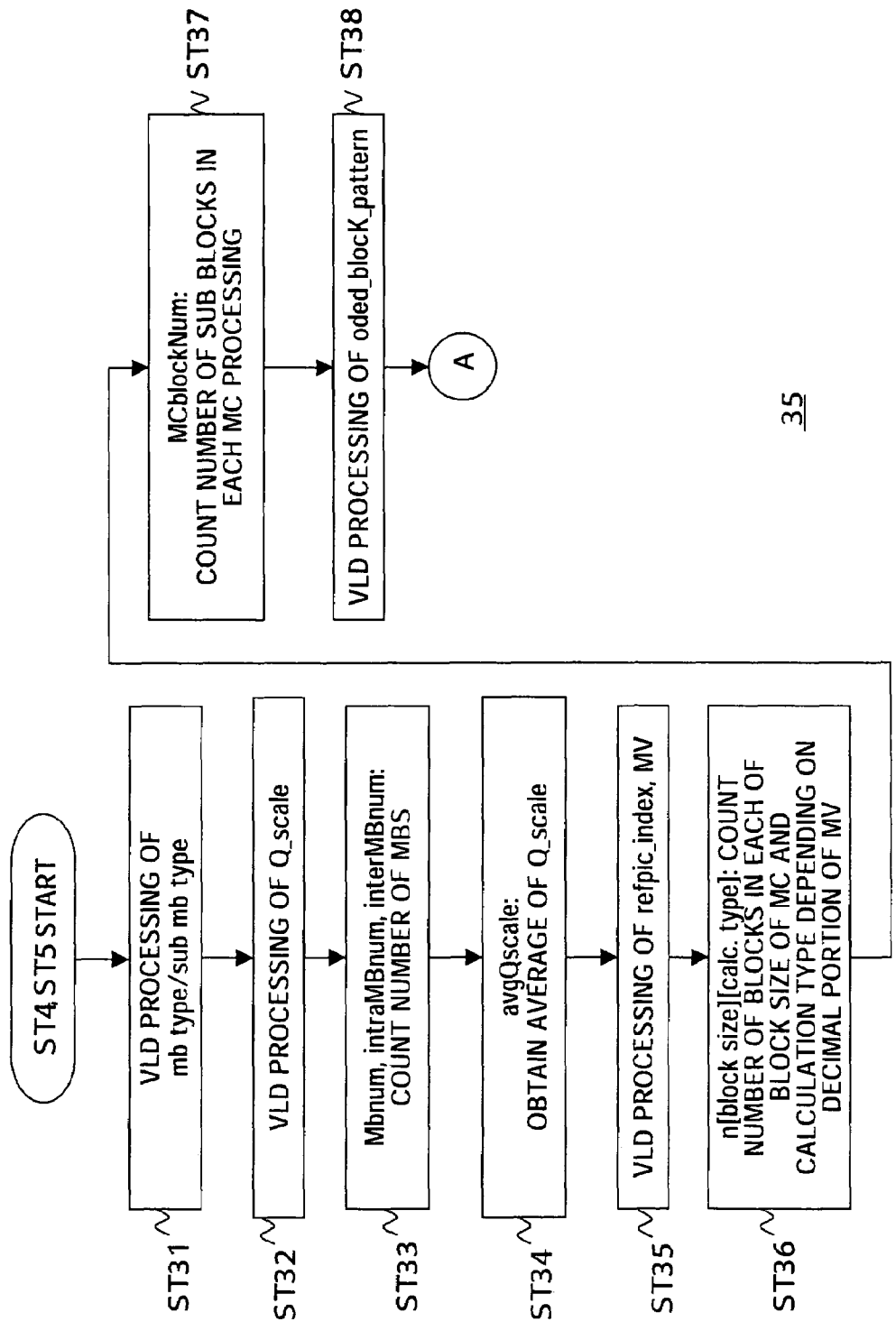
FIG. 9 is a flow chart for illustrating steps ST4 and ST5 (processing in the variable length decoding unit and a post-VLD clock control unit) shown in FIG. 4.
Figure 10:
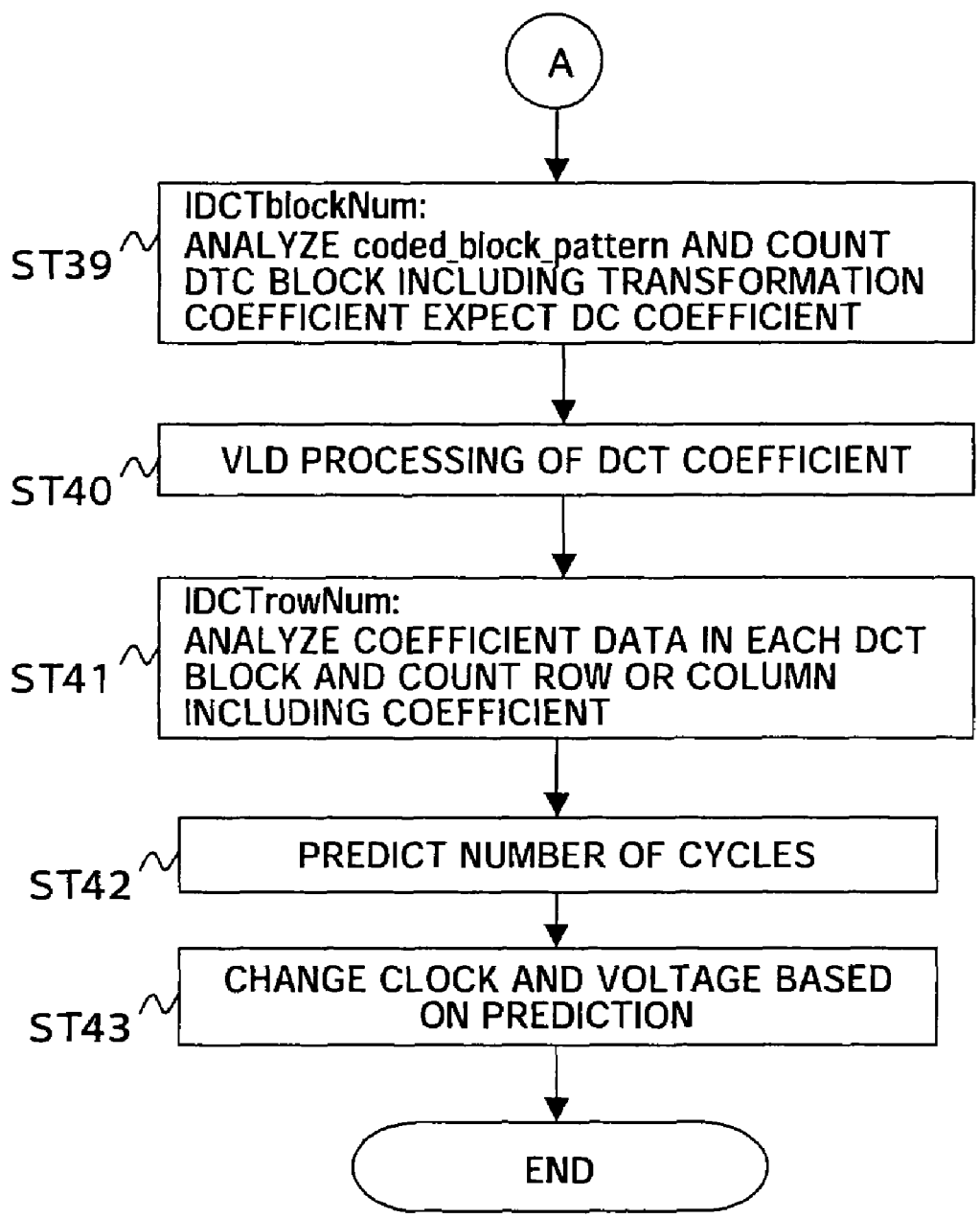
FIG. 10 is a flow chart following FIG. 9.

FIGS. 9 and 10 are flow charts for illustrating a processing in the variable length decoding unit 13 and the post-VLD clock control unit 35 shown in FIG. 2.

Step ST31:

The VLD unit 13 performs the variable length decoding processing on the macroblock type "mb_type" and the sub macroblock type "sub_mb_type" of the bitstream ED shown in FIG. 8.

Step ST32:

The VLD unit 13 performs the variable length decoding processing on the quantization scale "Q_scale".

Step ST33:

The post-VLD clock control unit 35 generates data "Mbnum" indicating the number of macroblocks MB included in the slice data to be processed, data "intraMBnum" indicating the number of intra macroblocks included in the slice data, and data "interMBnum" indicating the number of inter macroblocks included in the slice data, based on the result decoded by the VLD unit 13.

Step ST34:

The post-VLD clock control unit 35 calculates an average value "avgQscale" of the quantization scale Q_scale of the slice data to be processed.

Step ST35:

The VLD unit 13 performs the VLD processing on the reference picture index "refic_index" and motion vector MV of the bitstream ED shown in FIG. 8.

Step ST36:

The post-VLD clock control unit 35 generates data "n[block size][calculation type]" indicating the number of blocks in each combination of a block size such as 4×4 or 8×16 and a calculation type in an interpolation pixel position. Note that, 4×8 and 8×4 are for example treated as the same block size.

Step ST37:

The post-VLD clock control unit 35 generates data "MCblockNum" indicating the number of blocks treated as a processing unit for the motion prediction compensation processing in the slice data to be processed.

Step ST38:

The VLD unit 13 performs the VLD processing on an encoded block pattern "coded_block_pattern" of the bitstream ED.

Step ST39:

The post-VLD clock control unit 35 analyzes the encoded block pattern "coded_block_pattern" and generates data "IDCTblockNum" indicating the number of DCT blocks where transformation coefficients other than a direct current (DC) coefficient exist.

Step ST40

The VLD unit 13 performs the VLD processing on the transformation coefficients of the CDT blocks shown in FIG. 8.

Step ST41:

The post-VLD clock control unit 35 analyzes the transformation coefficients of each DCT block, and generates data "IDCTrowNum" indicating a matrix or a row including the transformation coefficient.

Steps ST42, TS43:

The post-VLD clock control unit 35 generates data indicating the prediction number of cycles subsequent to the VLD processing (post-VLD prediction cycle data) ISD3 based on the following formula (19), and changes the clock and the voltage based on the data ISD3.

(Formula 19)

$$ISD3 = vIDCTc + vIQc + vDEBc + vMCc + OTHERc \quad (19)$$

A processing in which the post-VLD clock control unit 35 generates each member of a right side in the above formula (19) will be described.

(vMCc in formula (19))

The motion prediction compensation processing performed by the motion prediction compensation unit 21 shown in FIG. 2 will be described.

The motion prediction compensation processing to AVC is performed at a quarter pixel precision.

Figure 11:
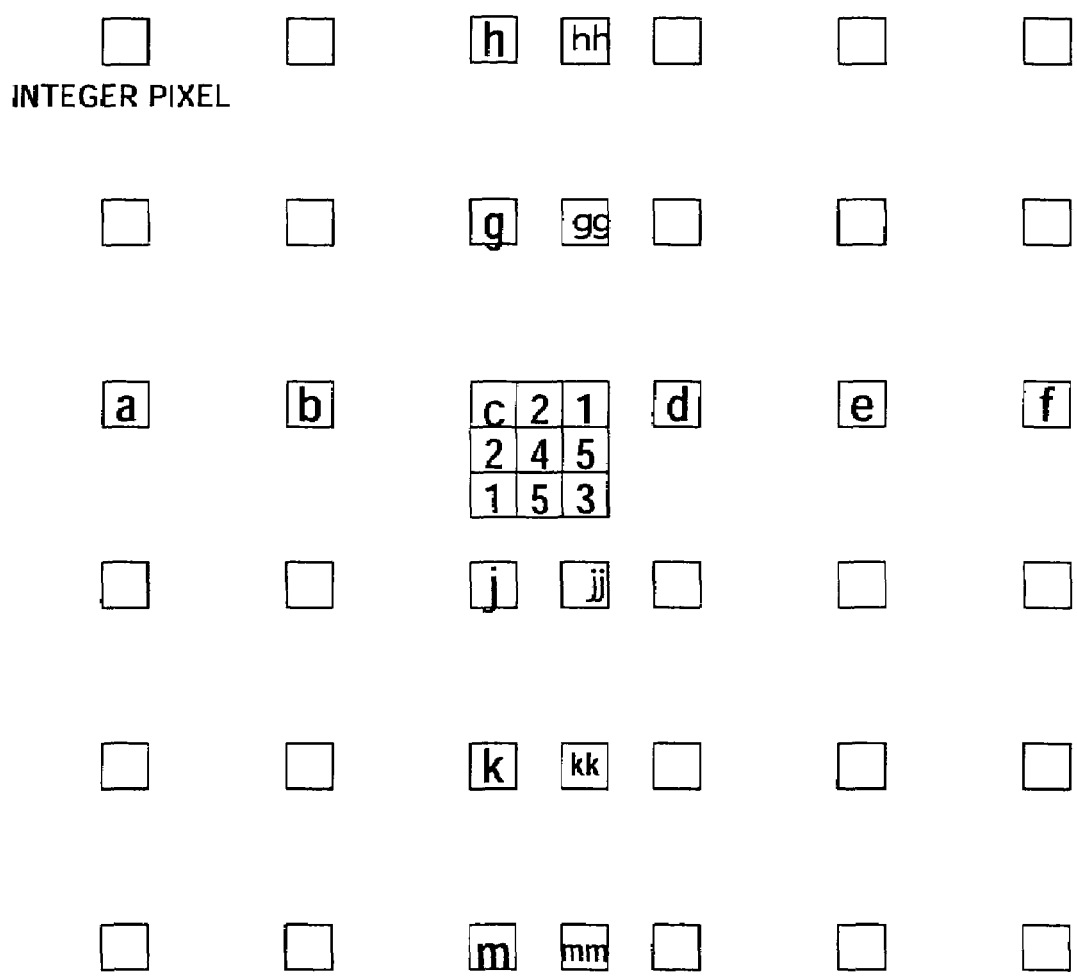
FIG. 11 is a view for illustrating a processing in a motion prediction compensation unit shown in FIG. 2.

In each integer pixel position, there is 16 number of the quarter pixel precision positions, which may be divided into six types illustrated by "1" to "5" in. FIG. 11 based on a calculation amount for an interpolation.

The calculation amount demanded for the processing in the motion prediction compensation unit 21 differs by which position the motion vector MV indicates in the quarter precision pixel positions.

The motion prediction compensation unit 21 calculates a processing of a lateral direction in "1" shown in FIG. 11 by applying the following formula (20).

(Formula 20)

$$AD1 = \text{Clip}(a - 5b + 20c + 20d - 5e + f + 16 >> 5) \quad (20)$$

Note that, a processing of a vertical direction is calculated by substituting h, g, and c for a, b, and c in the above formula (20).

The motion prediction compensation unit 21 calculates a processing in "2" by applying the following formula (21).

(Formula 21)

$$AD2 = AD1 + c + 1 >> 1 \quad (21)$$

AD2 is obtained as the approximately same value as AD1.

The motion prediction compensation unit 21 calculates a processing in "3" by applying the following formula (22).

(Formula 22)

$$AD3 = \text{Clip}(hh - 5gg + 20AD1 + 20jj - 5kk + mm + 16 >> 5) \quad (22)$$

AD3 is obtained as approximately two times value of AD1 because a pixel at a half precision position obtained by a filtering processing in the lateral direction is also used to the filtering processing in the vertical direction.

The motion prediction compensation unit 21 calculates a processing in "4" by applying the following formula (23).

(Formula 23)

$$AD4 = (AD1(\text{vertical}) + AD1(\text{lateral}) + 1) >> 1 \quad (23)$$

AD4 is obtained as approximately two times value of AD1.

The motion prediction compensation unit 21 calculates a processing in "5" by applying the following formula (24).

(Formula 24)

$$AD5 = (AD1 + AD3 + 1) >> 1 \quad (24)$$

AD5 is obtained as approximately three times value of AD1.

The post-VLD clock control unit 35 generates a prediction number clock data vMCc indicating a prediction number of clocks demanded for a processing in the motion prediction compensation unit 21, by applying the following formula (25).

(Formula 25)

$$vMCc = MC\text{blockNum} \times MC\text{addressCost} + (n[4 \times 4][\text{integer}] + n[4 \times 8][\text{integer}] \times 2 + n[8 \times 8][\text{integer}] \times 4 + n[8 \times 16][\text{integer}] \times 8 + n[16 \times 16][\text{integer}] \times 16) \times MC\text{no-FilterCost} + (n[4 \times 4][1] + n[4 \times 8][1] \times 2 + n[8 \times 8][1] \times 4 + n[8 \times 16][1] \times 8 + n[16 \times 16][1] \times 16) \times MC\text{filterCost1} + (n[4 \times 4][2] + n[4 \times 8][2] \times 2 + n[8 \times 8][2] \times 4 + n[8 \times 16][2] \times 8 + n[16 \times 16][2] \times 16) \times MC\text{filterCost2} + (n[4 \times 4][3] + n[4 \times 8][3] \times 2 + n[8 \times 8][3] \times 4 + n[8 \times 16][3] \times 8 + n[16 \times 16][3] \times 16) \times MC\text{filterCost3} + (n[4 \times 4][4] + n[4 \times 8][4] \times 2 + n[8 \times 8][4] \times 4 + n[8 \times 16][4] \times 8 + n[16 \times 16][4] \times 16) \times$$

$$MC\text{filterCost}4+(n[4\times4][5]+n[4\times8][5]\times2+n[8\times8]$$
$$[5]\times4+n[8\times16][5]\times8+n[16\times16][5]\times16)\times$$
$$MC\text{filterCost}5 \quad (25)$$

Where, "MCblockNum" indicates the number of blocks treated as a motion prediction compensation processing unit in a slice, "MCnoFilterCost" indicates a processing cycle such as only transfer due to no filter processing in the case of the integer pixel position, "MCaddressCost" indicates the number of cycles per second for example in an address calculation except for a motion prediction compensation filtering processing, "n[block size][calculation type]" indicates the number of blocks in every combination of block sizes such as 4×4 and 8×16 and the calculation types depending on the interpolation pixel position, and each of "MCfilterCost1" to "MCfilterCost5" indicates the number of cycles per second in the motion prediction compensation filtering processing in the calculation type.

"vMCc" depends on an image size and an image rate, is proportional to the number of processing macroblocks, and depends on a picture type.

"vMCc" becomes zero in an I-picture due to no motion prediction compensation and two times of a P-picture in a B-picture due to a both direction prediction.

"vMCc" depends on a precision of the motion vector MV.

"vVCc" becomes 1/15 times of the quarter pixel precision in the integer precision in the case of AVC.

"vVCc" depends on a format, for example becomes 1/3 of a half pixel precision in the integer pixel precision in the case of MPEG1 and MPEG2.

"vVCc" also depends on a MC block size and an interpolation pixel position (a decimal portion in the motion vector).

A processing amount of the motion prediction compensation processing depends on a characteristic each of the program PRG, the CPU 8, and the bus 9 shown in FIG. 1.

(vIDCTc in formula (19))

The post-VLD clock control unit 35 calculates "vIDCTc" as the prediction number of cycles in the IDCT processing performed by the IDCT•IQ unit 22 shown in FIG. 2, by applying the following formula (26) or (27).

(Formula 26)

$$vIDCTc = IDCT\text{blockNum} \times \text{block}IDCT\text{cost} \quad (26)$$

Where, "IDCTblockNum" indicates the number of 4×4 blocks including the DCT coefficient in the slice data, and "blockIDCTcost" indicates the number of cycles per second demanded for the IDCT processing performed on a block.

(Formula 27)

$$vIDCTc = IDCT\text{rowNum} \times \text{row}IDCT\text{cost} \quad (27)$$

Where, "IDCTrowNum" indicates a row number and a column number in 4×4 block including the DCT coefficient in the slice data, and "rowIDCTcost" indicates the number of cycles per second demanded for the IDCT processing performed on a row.

The IDCT processing is generally realized by performing one-dimensional IDCT processing each in a lateral direction and a vertical direction. The CPU 8 shown in FIG. 1 dose not perform the calculation each in the row and the column when each of the row and the column dose not include the transformation coefficient. Therefore, the calculation amount of IDCT depends on "IDCTrowNum".

Note that, if the CPU 8 is a parallel processor such as a single instruction multi data system (SIMD), a branch processing is not performed in a row and a column units but the calculation may be omitted only in a block unit. In this case, the calculation amount of IDCT depends on "IDCTblockNum".

(vIQc of formula (19))

The post-VLD clock control unit 35 calculates "vIQc" as the prediction number of cycles in the inverse quantization processing performed by the IDCT•IQ unit 22 shown in FIG. 2, by applying the following formula (28) or (29).

(Formula 28)

$$vIQc = IDCT\text{blockNum} \times \text{block}IQ\text{cost} \quad (28)$$

Where, "IDCTblockNum" indicates the number of 4×4 blocks including the DCT coefficient in the slice data, and "blockIQcost" indicates the number of cycles per second demanded for the inverse quantization processing performed on a block.

(Formula 29)

$$vIQc = IDCT\text{rowNum} \times \text{row}IQ\text{cost} \quad (29)$$

Where, "IDCTrowNum" indicates the row number and the column number in 4×4 block including the DCT coefficient in the slice data, and "rowIQcost" indicates the number of cycles per second demanded for the inverse quantization processing performed on a row.

In the inverse quantization processing, a formula to be used is changed depending on whether the processing unit is a row or a block in the same way as the IDCT processing. In the inverse quantization processing, although the calculation may be performed in each coefficient as the minimum unit, it is necessary to count a non-0 coefficient in VLD (IDCTcoefNum) in this case. The inverse quantization processing and IDCT may be performed simultaneously in AVC. In this case, "blockIDCTcost" and "rowIDCTcost" are substituted to items including the inverse quantization processing.

(vDEBc of formula (19))

The post-VLD clock control unit 35 calculates "vDEBc" as the prediction number of cycles in the deblocking filter processing performed by the deblocking filter unit 23 shown in FIG. 2, by applying the following formula (30).

(Formula 30)

$$vDEBc = Deb\text{FLAGcycle} + Deb\text{FILTERcycle} \quad (30)$$

The post-VLD clock control unit 35 calculates "DebFLAGcycle" in the above formula (30) by applying the following formula (31).

(Formula 31)

$$Deb\text{FLAGcycle} = \text{Intra}MB\text{num} \times \text{flagIntraCost} + \text{Inter-}$$
$$MB\text{num} \times \text{flagIntercost flag}IDCT\text{coef} \quad (31)$$

The post-VLD clock control unit 35 calculates "flagIDCTcoef" in the above formula (31) by applying the following formula (32).

(Formula 32)

$$\text{flag}IDCT\text{coef} = IDCT\text{blocknum} \times \text{flag}IDCT\text{effect} \quad (32)$$

The post-VLD clock control unit 35 calculates "DebFIL-TERcycle" in the above formula (30) by applying the following formula (33).

(Formula 33)

$$Deb\text{FILTERcycle} = (\text{Intra}MB\text{num} \times \text{flagIntraCost} + \text{Inter-}$$
$$MB\text{num} \times \max(\text{filter}IDCT\text{coef}, \text{filter}MC\text{block-}$$
$$\text{Coef})) \times \text{filter}Q\text{scaleCoef} \quad (33)$$

The post-VLD clock control unit 35 calculates "filterIDCTcoef", "filterMCblockCoef", and "filterQscaleCoef" in the above formula (33) by applying the following formulas (34) to (36).

(Formula 34)

$$\text{filter}IDCT\text{coef} = IDCT\text{blockNum} \times \text{filter}IDCT\text{effect} \quad (34)$$

(Formula 35)

$$\text{filter}MC\text{blockCoef} = MC\text{blockNum}/MB\text{num} \times \text{filterBlockNumEffect} \quad (35)$$

(Formula 36)

$$\text{filter}Q\text{scaleCoef} = \text{avg}Q\text{scale} \times \text{filter}Q\text{scaleEffect} \quad (36)$$

Where, "IntraMBnum" indicates the number of intra MBs included in a slice,

"InterMBnum" indicates the number of inter MBs included in the slice,

"flagIntracost" indicates the number of cycles per second demanded for a flag calculation in the intra MB, "flagInterCost" indicates the number of cycles per second demanded for the flag calculation in the inter MB, "flagIDCTcoef" indicates an influence coefficient of DTC coefficient upon a flag calculation cycle, "IDCTblockNum" indicates the number of 4×4 blocks including the DTC coefficient in the slice, "flagIDCTeffect" indicates a transformation coefficient of IDCTblockNum, "filterIntraCost" indicates the number of cycles per second demanded for a filter calculation in the intra MB, "filterIDCTcoef" indicates an influence coefficient of the DCT coefficient upon a filter calculation cycle, "filterMBblockCoef" indicates an influence coefficient of blocks different motion vector MV upon the filter calculation cycle, "MCblockNum" indicates the number of sub blocks to be a motion prediction compensation unit, "MBnum" indicates the number of MBs included in the slice,.

"filterBlockNumEffect" indicates a transformation coefficient of a ratio of the number of sub blocks to the number of MB, "filterQscaleCoef" indicates an influence coefficient of a quantization scaling size upon the filter calculation cycle, "avgQscale" indicates an average quantization scale of MBX in the slice, and "filterQscaleEffect" indicates a transformation coefficient of the average quantization scale.

The debloking filter 23 dose not perform the same strength filtering processing uniformity in a block boundary portion of the same frame (image) but determines the strength of the filtering processing to be carried out depending on a condition such that the block boundary to be subjected to the filter processing is a macroblock MB boundary.

The deblocking filter 23 generates the BS value indicating the strength in the block boundary of the image prior to the deblocking filter processing and carries out the filter processing on the block based on the BS value.

In the present embodiment, the deblocking filter 23 does not apply "filterQscaleCoef" in performing the filter calculation on the entire edge.

In the deblocking filter processing, when a pixel including an IDCT boundary is defined, whether or not the filtering is performed and the strength thereof are determined based on a different value in each boundary.

The entire operation of the decoding device 1 shown in FIG. 1 is performed as described above illustrated in FIG. 4.

As described above, the decoding device 1 predicts the number of clocks demanded for each of the motion prediction compensation processing, the IDCT processing, the inverse quantization processing, and the deblocking filter processing for an encoded data prior to the processing, and controls the power source 6 and the clock control circuit 7 based on the predicted result. Therefore, as shown in FIG. 3, a power consumption of the CPU 8 can be reduced up to the minimum necessary and corresponding to a load of the decoding processing for the encoded data, consequently, a power-saving can be realized.

According to the deciding device 1, the CPU 8 performs the decoding processing based on the program PRG, so a content to be processed can easily change.

Note that, FIGS. 12 and 13 illustrate relations between processing components and the number of cycles demanded for the components in the entire processing of the decoding device 1.

The present invention can be applied to a decoding system decoding an encoded data.

According to the present invention, the decoding method and the decoding device capable of reducing the power consumption for the decoding processing and the program for the same can be provided.

It should be understood by those skilled in the art that various modifications, combinations, sub-combinations and alterations may occur depending on design requirements and other factors in so far as they are within scope of the appeared claims or the equivalents thereof.

What is claimed is:

1. A decoding method executed by a decoding device decoding a data to be decoded including a header data and an encoded data, comprising:

a first step of generating a prediction load data indicating a prediction load in a decoding processing for the encoded data, based on an attribute data of the encoded data included in the header data;

a second step of determining an operating frequency based on the prediction load data generated in the first step; and a third step of operating at the operating frequency determined in the second step to decode the encoded data, wherein the header data includes as an attribute data a sequence data indicating a prediction information amount of decoding the encoded data in each unit time, and the first step generates the prediction load data based on the sequence header data;

wherein the encoded data includes a plurality of block data the same prediction direction and including a plurality of slice data different prediction direction, the header data corresponds to the plurality of slice data and includes as the attribute data a slice header data indicating the prediction direction of the slice data, the first step generates the prediction load data in each slice data based on the sequence header data and the slice header data, and the second step determines an operating frequency in each slice data based on the prediction load data generated in the first step corresponding to the slice data; and wherein, when the prediction load data is generated in the slice data in the same direction in the past, the first step is not performed on the slice data and the second step determines the operating frequency based on the prediction load data of the slice data in a prediction direction.

2. A decoding method as set forth in claim 1, wherein the second step lowers the determined operating frequency with a decrease of the prediction load indicated by the prediction load data.

3. A decoding method as set forth in claim 2, wherein the first step generates the prediction load data indicating a prediction number of clock cycles demanded for carrying out the decoding processing in the decoding device operating based on a clock signal, and the second step determines a frequency of the clock signal based on the prediction load data.

4. A decoding method as set forth in claim 1, wherein the decoding processing carries out an entropy decoding processing, a motion prediction compensation processing, an inverse orthogonal transformation processing, and an inverse quantization processing of the encoded data successively.

5. A decoding method as set forth in claim 1, wherein, when the encoded data is generated by performing the orthogonal transformation processing, the quantization processing, and the entropy encoding processing on a data to be encoded, the first step generates the prediction load data indicating a prediction processing amount of an inverse quantization processing corresponding to the quantization processing and an inverse orthogonal transformation processing corresponding to the orthogonal transformation processing based on a data given from an entropy decoding processing corresponding to the entropy encoding processing to the encoded data.

6. A computer readable storage medium bearing instructions that cause a decoding device decoding a data to be decoded including a header data and an encoded data, the instructions comprising:
    a first routine of generating a prediction load data indicating a prediction load in a decoding processing for the encoded data, based on an attribute data of the encoded data included in the header data;
    a second routine of determining an operating frequency based on the generated prediction load data; and
    a third routine of operating at the determined operating frequency to decode the encoded data,
    wherein the decoding processing carries out an entropy decoding processing, a motion prediction compensation processing, an inverse orthogonal transformation processing, and an inverse quantization processing of the encoded data successively;
    wherein the encoded data includes a plurality of block data the same prediction direction and including a plurality of slice data different prediction direction, the header data corresponds to the plurality of slice data and includes as the attribute data a slice header data indicating the prediction direction of the slice data, the first step generates the prediction load data in each slice data based on the sequence header data and the slice header data, and the second step determines an operating frequency in each slice data based on the prediction load data generated in the first step corresponding to the slice data; and
    wherein, when the prediction load data is generated in the slice data in the same direction in the past, the first step is not performed on the slice data and the second step determines the operating frequency based on the prediction load data of the slice data in a prediction direction.

7. A decoding method executed by a decoding device decoding a data to be decoded including a header data and an encoded data, comprising:
    a first step of generating a prediction load data indicating a prediction load in a decoding processing for the encoded data, based on an attribute data of the encoded data included in the header data;
    a second step of determining an operating frequency based on the prediction load data generated in the first step; and
    a third step of operating at the operating frequency determined in the second step to decode the encoded data, and
    wherein
        the decoding processing carries out an entropy decoding processing, a motion prediction compensation processing, an inverse orthogonal transformation processing, and an inverse quantization processing of the encoded data successively;
        the attribute data, in the header data, includes a sequence data indicating prediction information for decoding the encoded data in each unit time;
        the encoded data includes a plurality of block data having the same prediction direction and including a plurality of slice data having a different prediction direction, and the header data corresponds to the plurality of slice data and includes a slice header data, in the attribute data, indicating the prediction direction of the slice data;
        the first step generates the prediction load data in each slice data based on the sequence data and the slice header data; and
        the second step determines an operating frequency in each slice data based on the prediction load data generated in the first step corresponding to the slice data.

8. A decoding method as set forth in claim 7, wherein the second step lowers the determined operating frequency with a decrease of the prediction load indicated by the prediction load data.

9. A decoding method as set forth in claim 8, wherein the first step generates the prediction load data indicating a prediction number of clock cycles demanded for carrying out the decoding processing in the decoding device operating based on a clock signal, and
    the second step determines a frequency of the clock signal based on the prediction load data.

10. A decoding method as set forth in claim 7, wherein, when the prediction load data is generated in the slice data in the same direction in the past, the first step is not performed on the slice data and the second step determines the operating frequency based on the prediction load data of the slice data in a prediction direction.

11. A decoding method executed by a decoding device decoding a data to be decoded including a header data and an encoded data, comprising:
    a first step of generating a prediction load data indicating a prediction load in a decoding processing for the encoded data, based on an attribute data of the encoded data included in the header data;
    a second step of determining an operating frequency based on the prediction load data generated in the first step; and
    a third step of operating at the operating frequency determined in the second step to decode the encoded data, wherein, when the encoded data is generated by performing the orthogonal transformation processing, the quantization processing, and the entropy encoding processing on a data to be encoded, the first step generates the prediction load data indicating a prediction processing amount of an inverse quantization processing corresponding to the quantization processing and an inverse orthogonal transformation processing corresponding to the orthogonal transformation processing based on a data given from an entropy decoding processing corresponding to the entropy encoding processing to the encoded data, the attribute data, in the header data, includes a sequence data indicating prediction information for decoding the encoded data in each unit time;

the encoded data includes a plurality of block data having the same prediction direction and including a plurality of slice data having a different prediction direction, and the header data corresponds to the plurality of slice data and includes a slice header data, in the attribute data, indicating the prediction direction of the slice data;

the first step generates the prediction load data in each slice data based on the sequence data and the slice header data; and the second step determines an operating frequency in each slice data based on the prediction load data generated in the first step corresponding to the slice data.

12. A decoding method as set forth in claim 11, wherein the second step lowers the determined operating frequency with a decrease of the prediction load indicated by the prediction load data.

13. A decoding method as set forth in claim 11, wherein the first step generates the prediction load data indicating a prediction number of clock cycles demanded for carrying out the decoding processing in the decoding device operating based on a clock signal, and the second step determines a frequency of the clock signal based on the prediction load data.

14. A decoding method as set forth in claim 11, wherein, when the prediction load data is generated in the slice data in the same direction in the past, the first step is not performed on the slice data and the second step determines the operating frequency based on the prediction load data of the slice data in a prediction direction.

* * * * *